(12) United States Patent
van Petegem et al.

(10) Patent No.: US 8,011,431 B2
(45) Date of Patent: Sep. 6, 2011

(54) PROCESS AND SYSTEM FOR CREATING ENHANCED CAVITATION

(75) Inventors: Ronald van Petegem, Montgomery, TX (US); Barry Ekstrand, Katy, TX (US)

(73) Assignee: Clearwater International, LLC, Houston, TX (US)

( * ) Notice: Subject to any disclaimer, the term of this patent is extended or adjusted under 35 U.S.C. 154(b) by 308 days.

(21) Appl. No.: 12/357,556

(22) Filed: Jan. 22, 2009

(65) Prior Publication Data
US 2010/0181071 A1   Jul. 22, 2010

(51) Int. Cl.
*E21B 43/22* (2006.01)

(52) U.S. Cl. .......................... 166/270; 166/263; 166/292

(58) Field of Classification Search .................. 166/270, 166/272.2, 263, 281, 292
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |

(Continued)

FOREIGN PATENT DOCUMENTS

CA   2007965   8/1990

(Continued)

OTHER PUBLICATIONS

U.S. Appl. No. 12/075,461, Gatlin et al.

(Continued)

*Primary Examiner* — Zakiya W Bates
*Assistant Examiner* — Catherine Loikith
(74) *Attorney, Agent, or Firm* — Robert W Strozier

(57) ABSTRACT

A system and method for cavitating a producible formation is disclosed to improve hydrocarbon production and to increase a production rate without an concurrent co-production of formation particulate. The method and system include conglomerating the producible formation using a conglomerating composition. Once the producible formation is conglomerated, the conglomerated, producible formation is produced above its critical draw down pressure to form a cavity surrounding the wellborn in the conglomerated, producible formation and placing the cavitated, conglomerated, producible formation on production below a higher maximum sand free rate (MSFR).

21 Claims, 8 Drawing Sheets

U.S. PATENT DOCUMENTS

| | | | | |
|---|---|---|---|---|
| 4,506,734 A | 3/1985 | Nolte | | 166/308.1 |
| 4,514,309 A | 4/1985 | Wadhwa | | 507/211 |
| 4,541,935 A | 9/1985 | Constien et al. | | 507/225 |
| 4,549,608 A | 10/1985 | Stowe et al. | | 166/280.1 |
| 4,561,985 A | 12/1985 | Glass, Jr. | | 507/108 |
| 4,623,021 A | 11/1986 | Stowe | | 166/250.1 |
| 4,654,266 A | 3/1987 | Kachnik | | 428/403 |
| 4,657,081 A | 4/1987 | Hodge | | 166/380.5 |
| 4,660,643 A | 4/1987 | Perkins | | 166/283 |
| 4,683,068 A | 7/1987 | Kucera | | 507/201 |
| 4,686,052 A | 8/1987 | Baranet et al. | | 507/244 |
| 4,695,389 A | 9/1987 | Kubala | | 507/244 |
| 4,705,113 A | 11/1987 | Perkins | | 166/302 |
| 4,714,115 A | 12/1987 | Uhri | | 166/308.1 |
| 4,718,490 A | 1/1988 | Uhri | | 166/281 |
| 4,724,905 A | 2/1988 | Uhri | | 166/250.1 |
| 4,725,372 A | 2/1988 | Teot et al. | | 507/129 |
| 4,739,834 A | 4/1988 | Peiffer et al. | | 166/308.4 |
| 4,741,401 A | 5/1988 | Walles et al. | | 166/300 |
| 4,748,011 A | 5/1988 | Baize | | 423/228 |
| 4,779,680 A | 10/1988 | Sydansk | | 166/300 |
| 4,795,574 A | 1/1989 | Syrinek et al. | | 507/238 |
| 4,817,717 A | 4/1989 | Jennings, Jr. et al. | | 166/278 |
| 4,830,106 A | 5/1989 | Uhri | | 166/250.1 |
| 4,846,277 A | 7/1989 | Khalil et al. | | 166/280.1 |
| 4,848,468 A | 7/1989 | Hazlett et al. | | 166/300 |
| 4,852,650 A | 8/1989 | Jennings, Jr. et al. | | 166/250.1 |
| 4,869,322 A | 9/1989 | Vogt, Jr. et al. | | 166/280.1 |
| 4,892,147 A | 1/1990 | Jennings, Jr. et al. | | 166/280.2 |
| 4,926,940 A | 5/1990 | Stromswold | | 166/247 |
| 4,938,286 A | 7/1990 | Jennings, Jr. | | 166/280.1 |
| 4,978,512 A | 12/1990 | Dillon | | 423/226 |
| 5,005,645 A | 4/1991 | Jennings, Jr. et al. | | 166/280.1 |
| 5,024,276 A | 6/1991 | Borchardt | | 166/308.6 |
| 5,067,556 A | 11/1991 | Fudono et al. | | 62/196.4 |
| 5,074,359 A | 12/1991 | Schmidt | | 166/280.1 |
| 5,074,991 A | 12/1991 | Weers | | 208/236 |
| 5,082,579 A | 1/1992 | Dawson | | 507/211 |
| 5,106,518 A | 4/1992 | Cooney et al. | | 507/21 |
| 5,110,486 A | 5/1992 | Manalastas et al. | | 507/260 |
| 5,169,411 A | 12/1992 | Weers | | 44/421 |
| 5,224,546 A | 7/1993 | Smith et al. | | 166/300 |
| 5,228,510 A | 7/1993 | Jennings, Jr. et al. | | 166/263 |
| 5,246,073 A | 9/1993 | Sandiford et al. | | 166/295 |
| 5,259,455 A | 11/1993 | Nimerick et al. | | 166/308.5 |
| 5,330,005 A | 7/1994 | Card et al. | | 166/280.2 |
| 5,342,530 A | 8/1994 | Aften et al. | | 252/8.551 |
| 5,347,004 A | 9/1994 | Rivers et al. | | 544/180 |
| 5,363,919 A | 11/1994 | Jennings, Jr. | | 166/308.1 |
| 5,402,846 A | 4/1995 | Jennings, Jr. et al. | | 166/259 |
| 5,411,091 A | 5/1995 | Jennings, Jr. | | 166/280.1 |
| 5,424,284 A | 6/1995 | Patel et al. | | 507/129 |
| 5,439,055 A | 8/1995 | Card et al. | | 166/280.2 |
| 5,462,721 A | 10/1995 | Pounds et al. | | 423/226 |
| 5,465,792 A | 11/1995 | Dawson et al. | | 166/295 |
| 5,472,049 A | 12/1995 | Chaffee et al. | | 166/250.1 |
| 5,482,116 A | 1/1996 | El-Rabaa et al. | | 166/250.1 |
| 5,488,083 A | 1/1996 | Kinsey, III et al. | | 507/211 |
| 5,497,831 A | 3/1996 | Hainey et al. | | 166/308.1 |
| 5,501,275 A | 3/1996 | Card et al. | | 166/280.2 |
| 5,551,516 A | 9/1996 | Norman et al. | | 166/308.2 |
| 5,624,886 A | 4/1997 | Dawson et al. | | 507/217 |
| 5,635,458 A | 6/1997 | Lee et al. | | 507/240 |
| 5,649,596 A | 7/1997 | Jones et al. | | 166/300 |
| 5,669,447 A | 9/1997 | Walker et al. | | 166/300 |
| 5,674,377 A | 10/1997 | Sullivan, III et al. | | 208/208 R |
| 5,688,478 A | 11/1997 | Pounds et al. | | 423/228 |
| 5,693,837 A | 12/1997 | Smith et al. | | 556/148 |
| 5,711,396 A | 1/1998 | Joerg et al. | | 180/444 |
| 5,722,490 A | 3/1998 | Ebinger | | 166/281 |
| 5,744,024 A | 4/1998 | Sullivan, III et al. | | 208/236 |
| 5,755,286 A | 5/1998 | Ebinger | | 166/281 |
| 5,775,425 A | 7/1998 | Weaver et al. | | 166/276 |
| 5,787,986 A | 8/1998 | Weaver et al. | | 166/280.2 |
| 5,806,597 A | 9/1998 | Tjon-Joe-Pin et al. | | 166/300 |
| 5,807,812 A | 9/1998 | Smith et al. | | 507/238 |
| 5,833,000 A | 11/1998 | Weaver et al. | | 166/276 |
| 5,853,048 A | 12/1998 | Weaver et al. | | 166/279 |
| 5,871,049 A | 2/1999 | Weaver et al. | | 166/276 |
| 5,877,127 A | 3/1999 | Card et al. | | 507/273 |
| 5,908,073 A | 6/1999 | Nguyen et al. | | 166/276 |
| 5,908,814 A | 6/1999 | Patel et al. | | 507/131 |
| 5,964,295 A | 10/1999 | Brown et al. | | 166/308.2 |
| 5,979,557 A | 11/1999 | Card et al. | | 166/300 |
| 5,980,845 A | 11/1999 | Cherry | | 423/229 |
| 6,016,871 A | 1/2000 | Burts, Jr. | | 166/300 |
| 6,035,936 A | 3/2000 | Whalen | | 166/308.5 |
| 6,047,772 A | 4/2000 | Weaver et al. | | 166/276 |
| 6,054,417 A | 4/2000 | Graham et al. | | 507/238 |
| 6,059,034 A | 5/2000 | Rickards et al. | | 166/280.2 |
| 6,060,436 A | 5/2000 | Snyder et al. | | 507/266 |
| 6,069,118 A | 5/2000 | Hinkel et al. | | 507/277 |
| 6,123,394 A | 9/2000 | Jeffrey | | 299/16 |
| 6,133,205 A | 10/2000 | Jones | | 507/276 |
| 6,147,034 A | 11/2000 | Jones et al. | | 507/238 |
| 6,162,449 A | 12/2000 | Maier et al. | | 424/401 |
| 6,162,766 A | 12/2000 | Muir et al. | | 507/267 |
| 6,169,058 B1 | 1/2001 | Le et al. | | 507/222 |
| 6,228,812 B1 | 5/2001 | Dawson et al. | | 507/221 |
| 6,247,543 B1 | 6/2001 | Patel et al. | | 175/64 |
| 6,267,938 B1 | 7/2001 | Warrender et al. | | 423/226 |
| 6,283,212 B1 | 9/2001 | Hinkel et al. | | 166/279 |
| 6,291,405 B1 | 9/2001 | Lee et al. | | 507/136 |
| 6,330,916 B1 | 12/2001 | Rickards et al. | | 166/280.2 |
| 6,725,931 B2 | 4/2004 | Nguyen et al. | | 166/280.2 |
| 6,756,345 B2 | 6/2004 | Pakulski et al. | | 507/246 |
| 6,793,018 B2 | 9/2004 | Dawson et al. | | 166/300 |
| 6,832,650 B2 | 12/2004 | Nguyen et al. | | 166/279 |
| 6,875,728 B2 | 4/2005 | Gupta et al. | | 507/240 |
| 7,140,433 B2 | 11/2006 | Gatlin et al. | | 166/250.01 |
| 7,268,100 B2 | 9/2007 | Kippie et al. | | 507/244 |
| 7,350,579 B2 | 4/2008 | Gatlin et al. | | 166/308.3 |
| 7,392,847 B2 * | 7/2008 | Gatlin et al. | | 166/308.1 |
| 2002/0049256 A1 | 4/2002 | Bergeron, Jr. | | 514/674 |
| 2002/0165308 A1 | 11/2002 | Kinniard et al. | | 524/492 |
| 2003/0220204 A1 | 11/2003 | Baran, Jr. | | 507/200 |
| 2005/0045330 A1 | 3/2005 | Nguyen et al. | | 166/281 |
| 2005/0092489 A1 | 5/2005 | Welton et al. | | 166/280.2 |
| 2005/0137114 A1 | 6/2005 | Gatlin et al. | | 510/424 |
| 2005/0153846 A1 | 7/2005 | Gatlin | | 208/236 |
| 2005/0250666 A1 | 11/2005 | Gatlin et al. | | 510/492 |
| 2006/0194700 A1 | 8/2006 | Gatlin et al. | | 507/203 |
| 2007/0032693 A1 | 2/2007 | Gatlin et al. | | 507/239 |
| 2007/0129257 A1 | 6/2007 | Kippie et al. | | 507/102 |
| 2007/0131422 A1 * | 6/2007 | Gatlin et al. | | 166/280.1 |
| 2007/0131425 A1 | 6/2007 | Gatlin et al. | | 166/280.2 |
| 2007/0173413 A1 | 7/2007 | Lukocs et al. | | 507/238 |
| 2007/0173414 A1 | 7/2007 | Wilson, Jr. | | 507/131 |
| 2008/0039345 A1 | 2/2008 | Kippie et al. | | 507/213 |
| 2008/0257553 A1 * | 10/2008 | Gatlin et al. | | 166/280.2 |
| 2010/0212905 A1 * | 8/2010 | van Petegem et al. | | 166/308.2 |

FOREIGN PATENT DOCUMENTS

| | | |
|---|---|---|
| CA | 2125513 | 1/1995 |
| DE | 4027300 | 3/1992 |
| EP | 0730018 | 9/1996 |
| GB | 775376 | 5/1957 |
| GB | 1073338 A | 6/1967 |
| GB | 816337 A | 10/2008 |
| JP | 08151422 | 6/1996 |
| JP | 10001461 | 1/1998 |
| JP | 10110115 A | 4/1998 |
| JP | 2005194148 | 7/2005 |
| WO | WO 98/19774 | 5/1998 |
| WO | WO 98/56497 | 12/1998 |

OTHER PUBLICATIONS

U.S. Appl. No. 11/554,834, Venditto et al.
U.S. Appl. No. 11/765,306, Kakadjian et al.
U.S. Appl. No. 11/748,248, Thompson et al.
U.S. Appl. No. 11/736,971, Kippie et al.
U.S. Appl. No. 11/767,384, Sweeney et al.
U.S. Appl. No. 11/741,110, Wilson, Jr. et al.
U.S. Appl. No. 11/677,434, Wanner et al.
U.S. Appl. No. 11/736,992, Zamora et al.

U.S. Appl. No. 11/760,581, Schwartz.
U.S. Appl. No. 12/029,335, Kakadjian et al.
Sartori, F. and Savage, D.W., Sterically Hindered Amines for CO2 Removal from Gases, Ind. Eng. Chem. Fundam. 1983, 22, 239-249.
Fushslueger, U., Socher, G., Grether, H-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.
Kauffman, W.J., Observations on the Synthesis and Characterization of N,N',N"-Tris-(dimethylaminopropyly)hexahydro-s-triazine and isolable intermediates, XP009005168.
Delepine, M., Effect of Hydrogen Sulfide on Trimethyltrimethyl Triamine, Bull. Soc. Chim., 1896, 14, 889-891 (English Translation).
Delepine, M., Effect of Hydrogen Sulfide and Trimethyltrimethyl Triamine, Ann. Chim. Phys., 1986, 4, 114-133 (English Translation).
Paquin, A.M., Reaction of Primary Amines with Aliphatic Aldehydes, Chem. Ber., 1949, 82, 316-326 (English Translation).
Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

* cited by examiner

Inject Conglomeration Chemicals

Conglomerated Formation

Cavitate the Conglomerated Formation

Produce the Cavitated, Conglomerated Formation

Inject Consolidation Chemicals

Consolidated Formation

Produce Consolidated, Cavitated Formation

PROCESS AND SYSTEM FOR CREATING ENHANCED CAVITATION

BACKGROUND OF THE INVENTION

1. Field of the Invention

Embodiments of this invention relate to a process and system for creating cavities within a producible formation or zone thereof to reduce or eliminate co-production of sand. In certain embodiments, the process and system permits an increase of a MSFR of a cavitated formation.

More particularly, embodiments of this invention relate to a process and system for creating cavities within a producible formation or zone thereof to reduce or eliminate co-production of sand, where the method and system includes introducing an aggregation, agglomeration or conglomeration composition into a producible formation or zone to prevent or reduce formation collapse, and then producing the formation above its critical draw down pressure to create a cavity or cavities around or surrounding the well bore in the producible formation or zone, and thus reduce the relative draw down pressure at which the producible formation or zone can be produced.

2. Description of the Related Art

In prior art, operators have attempted to create cavities behind production casing or liners in an effort to increase a production flow area and to reduce a relative draw down pressure of a producing well or formation and to allow higher sand free production rates. However, formation collapse problems are sometimes encountered when attempting to create cavities in weakly consolidated, semi-consolidated, or unconsolidated formations, diminishing the enhancing effects of the cavity formation.

Thus, there is a need in the art for a method and system for forming cavities in producing formations or zones therein that enhance the formation strength in such away that formation collapse is eliminated or reduced during the cavity creation process.

Definition

The term formation particulate means any solid material such as sand, formation fines, proppant, etc. that is co-produced with production fluid when an oil and/or gas well is placed on production.

The term MSFR means maximum sand free production rate, which is the maximum production rate that can be achieved from a well without the co-production of sand or formation particulate.

The term cavitation or cavitating means to form cavities around production tubing, casing or cemented casing, i.e., to produce a volume free or substantially free of formation particulate surrounding the production tubing, casing or cemented casing.

The term cavitated formation means a formation having a cavity or cavities surrounding the production tubing, casing or cemented casing.

The term draw down pressure means a reduction in a pressure that is required to move the content, such as but not limited to, oil, gas and/or water, of the formation or zone into the casing, liner or tubing.

The term critical draw down pressure means the reduction in a pressure that is required to co-produce formation particulate into the casing or liner or tubing.

The term conglomerated means a formation or zone treated with an aggregation, agglomeration, or conglomeration composition.

The term relative draw down pressure means draw down pressure per unit area of the producing formation or zone.

The term substantially eliminate co-production of particulate free or other similar usage means that the produced fluids have less than 5 wt. % formation particulate. In certain embodiments, the term means that the produced fluids have less than 2.5 wt. % formation particulate. In certain embodiments, the term means that the produced fluids have less than 1 wt. % formation particulate. In certain embodiments, the term means that the produced fluids have less than 0.5 wt. % formation particulate. In certain embodiments, the term means that the produced fluids have less than 0.1 wt. % formation particulate.

The term producible formation means a weakly consolidated, semi-consolidated or unconsolidated hydrocarbon bearing formation that is capable of producing such hydrocarbons. These hydrocarbons, such as, but not limited to, gas, oil, or gas condensate, can be produced separately or in any combination with each other. In some cases, the producing formation may also produce water in combination with such hydrocarbons.

The term producible zone means a portion or section of a producible formation.

The term non-producible formation means a formation that is incapable of producing hydrocarbons.

The term non-producible zone means a portion or section within either a producible formation or a non-producible formation that is incapable of producing hydrocarbons.

SUMMARY OF THE INVENTION

An embodiment of this invention provides a method for cavitating producible formations or zones therein. The method includes introducing an aggregation, agglomeration, or conglomeration composition into a producible formation or zone therein to reduce or prevent formation cave in or collapse. Once the aggregation, agglomeration or conglomeration composition has been introduced into a producible formation, the method also includes producing the formation above its critical draw down pressure to create a cavity or cavities around the well bore and/or casing or liner and/or cemented casing or liner in the producible formation or zone thereof. After the formation or zone is cavitated, the method also includes producing the cavitated formation or zone below its critical draw down pressure, where the cavity or the cavities decrease the relative draw down pressure and thus reduce, substantially eliminate or eliminate co-production of sand.

An embodiment of this invention provides a method for cavitating producible formations or zones therein. The method includes introducing an aggregation, agglomeration, or conglomeration composition into a producible formation or zone therein to reduce or prevent formation cave in or collapse. Once the formation has been conglomerated, the method also includes producing the formation above its critical draw down pressure to create a cavity or cavities around the well bore and/or casing or liner and/or cemented casing or liner in the producible formation or zone thereof. After the formation or zone is cavitated, the method includes introducing a second aggregation, agglomeration, or conglomeration composition and/or a consolidation composition into the cavitated formation or zone to form a further conglomerated and/or consolidated and cavitated formation or zone therein. After the further conglomeration or consolidation of the formation or zone, the method also includes producing the further conglomerated or consolidated and cavitated formation or zone below its critical draw down pressure, where the cavity or the cavities decrease the relative draw down pressure and thus reduce, substantially eliminate or eliminate co-production of sand.

An embodiment of this invention provides a system for cavitating producible formations or zones therein. The system includes an aggregation, agglomeration, or conglomeration composition and injection equipment adapted to introduce the aggregation, agglomeration, or conglomeration composition into a producible formation or zone therein to form a conglomerated formation to reduce or prevent formation cave in or collapse during subsequent treatment. The system also includes equipment to produce the formation above its critical draw down pressure to create a cavity or cavities around the well bore and/or casing or liner and/or cemented casing or liner in the producible formation or zone thereof. The system also includes equipment to produce the cavitated well below its critical draw down pressure, where the cavity or the cavities decrease the relative draw down pressure and thus reduce, substantially eliminate or eliminate co-production of sand.

An embodiment of this invention provides a system for cavitating producible formations or zones therein. The system includes an aggregation, agglomeration, or conglomeration composition and injection equipment adapted to introduce the aggregation, agglomeration, or conglomeration composition into a producible formation or zone therein to form a conglomerated formation to reduce or prevent formation cave in or collapse. The system also includes equipment to produce the formation above its critical draw down pressure to create a cavity or cavities around the well bore and/or casing or liner and/or cemented casing or liner in the producible formation or zone thereof. The system also includes a second aggregation, agglomeration, or conglomeration composition and/or a formation consolidation composition and injection equipment adapted to introduce the second aggregation, agglomeration, or conglomeration composition and/or the formation consolidation composition into the cavitated formation or zone to form a further conglomerated and/or consolidated, cavitated formation or zone. The system also includes equipment to produce the further conglomerated and/or consolidated, cavitated formation or zone below its critical draw down pressure, where the cavity or the cavities decrease the relative draw down pressure and thus reduce, substantially eliminate or eliminate co-production of sand.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
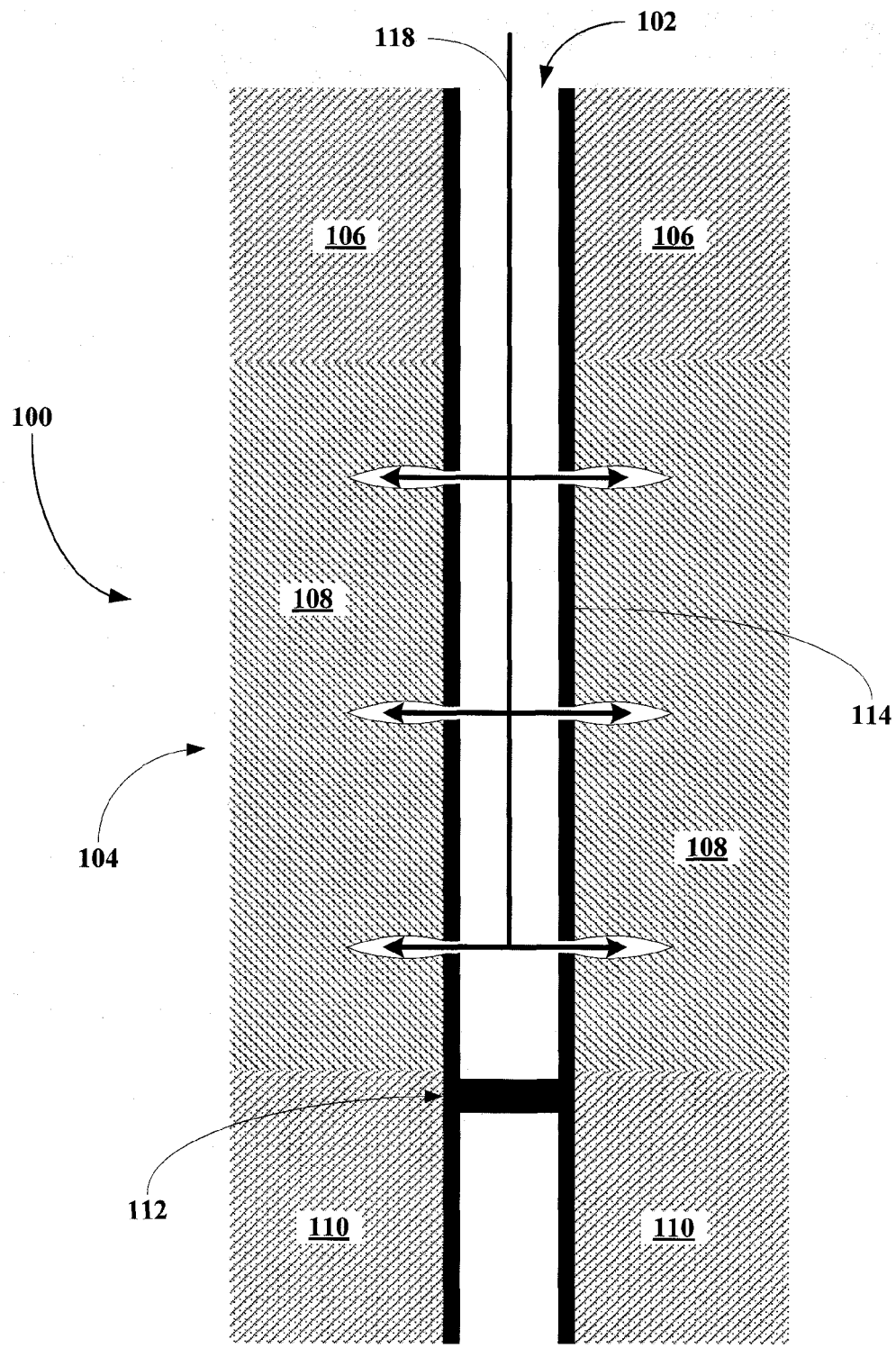
FIG. 1A depicts injection of an aggregation, agglomeration, or conglomeration chemical composition into a producible formation.

The inventors have found that a method and system can be established to reduce, substantially eliminate or eliminate co-production of formation particulate in weakly consolidated, semi-consolidated or unconsolidated producible formation or zones thereof. The systems and methods include a treatment that permits the formation or zones therein to be cavitated, i.e., to produce a cavity or cavities between the production tubing and/or production equipment and the producible formation or zone. After implementing these systems or methods, treated wells produce at a higher MSFR.

In certain embodiments, the method includes chemically treating the producible formation or zone by squeezing or forcing into the formation or zone a chemical composition causing aggregation, agglomeration, or conglomeration of formation particulate in a producible formation or zone. The chemical treatment will change a zeta potential of the surface of the sand particles to a zeta potential sufficient to agglomerate the sand grains resulting in an improved consolidation of the formation. By producing the treated well above its critical draw down pressure, portions of the conglomerated formation particulate are removed creating a cavity or cavities in the formation or zone. The formation is produced above its critical draw down pressure until a desired sand production rate is achieved or until no additional sand is removed from the formation or zone, i.e., until sand production falls below a desired level, which can be zero sand production.

The method includes squeezing, injecting or pumping an aggregation, agglomeration, or conglomeration chemical composition into a producible formation or zone, where the aggregation, agglomeration, or conglomeration chemical composition is adapted to reduce or prevent formation cave in or collapse by agglomerating the particles in the formation in such as way that the particles can detach and reattach from the agglomerated formation. After conglomeration, the formation or zone is placed on production above its critical draw down pressure to create a cavity or cavities surrounding the producing well borehole or zone, e.g., casing, liner, etc., by the co-production of formation sand or formation particulate until a desired flow rate of sand or particulate is achieved. The method also includes the optional step of squeezing, injecting or pumping into the cavitated formation or zone an additional or supplemental conglomeration or consolidation chemical composition to enhance the conglomeration of the formation or zone after cavitation formation. The method also includes producing the formation or zone at a pressure below its critical draw down pressure. The method and system have been designed to provide the producible formation or zones with controlled cavitation and consolidation sufficient to allow the formation or zone to produce with reduced co-production of sand or other fines, with reducing caving in or collapse occurrences. As a result of undergoing the method and system, wells will be able to produce at a higher MSFR.

General Principles of Aggregation, Agglomeration or Conglomeration

Chemical aggregation, agglomeration, or conglomeration is a formation treatment that is designed to convert weakly consolidated, semi consolidated or unconsolidated formations into conglomerated formations. The treatment composition is designed to partially or completely coat the particles of the formation changing their aggregation, agglomeration or conglomeration propensity or potential and/or zeta potential so that the particles tend to aggregate with sufficient strength to reduce or eliminate formation collapse or cave in during subsequent above critical draw down pressure production. Unlike consolidation compositions, these compositions do not interact with the formation particles to form a consolidated matrix, but merely forms conglomeration of particles, where the "bonds" between the particles can be broken and reformed under flow conditions. Under enhanced flow conditions, the "bonds" between the particles are broken and the dislodged particles are entrained in the fluid flow. In this way, material can be removed from the formation surrounding the well bore in desired zones of a producible formation without risking formation collapse or cave in during cavitation.

Amine/Phosphate Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Surface Acidifying and Modifying Compositions

Embodiments of the present invention provides a substrate including a metal oxide-containing solid surface treated with a treating composition, which imparts to the surface improved aggregating properties or improved particulate adherence or affinity properties, where the composition includes at least an acidifying agent and a surface modifying agent. The substrates are ideally suited for use in downhole applications.

Embodiments of the present invention provides a composition including: (1) a particulate metal oxide-containing solid surface acidifying agent; and (2) a particulate metal oxide-containing solid surface modifying agent. Other embodiments of the present invention provides a composition including: (1) a particulate metal oxide-containing solid surface acidifying agent; (2) a particulate metal oxide-containing solid surface modifying agent; and (3) a fluid carrier. Other embodiments of the present invention provides a composition including: (1) a particulate metal oxide-containing solid surface acidifying agent; (2) a particulate metal oxide-containing solid surface modifying agent; (3) an aggregation enhancing agent; and (4) fluid carrier. Other embodiments of the present invention provides a composition including: (1) a particulate metal oxide-containing solid surface acidifying agent; (2) a particulate metal oxide-containing solid surface modifying agent; (3) an aggregation enhancing agent; (4) a thickening agent; and (5) a fluid carrier. Other embodiments of the present invention provides a composition including: (1) a particulate metal oxide-containing solid surface acidifying agent; (2) a particulate metal oxide-containing solid surface modifying agent; and (3) a particulate metal oxide-containing solid surface exchange agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; and (4) a fluid carrier. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; and (4) an aggregation enhancing agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a fluid carrier. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a thickening agent. Other embodiments of the present invention also provides a composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; (5) a thickening agent; and (6) a fluid carrier. Other embodiments of the present invention provides an aqueous composition including: (1) a particulate metal oxide-containing solid surface acidifying agent; (2) a particulate metal oxide-containing solid surface modifying agent; and (3) a particulate metal oxide-containing solid surface exchange agent. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; and (4) an aqueous carrier. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) an aqueous carrier. Other embodiments of the present invention also provides an aqueous composition including: (1) a particulate metal oxide-containing solid surface acidifying agent; (2) a particulate metal oxide-containing solid surface modifying agent; (3) a particulate metal oxide-containing solid surface exchange agent; (4) an aggregation enhancing agent; and (5) a thickening agent; and (6) an aqueous carrier.

General Principles of Consolidation

Chemical consolidation is a formation treatment that converts a weakly consolidated, semi consolidated or unconsolidated formation into a consolidated formation. The treatment is generally injected into the formation under pressures so that the consolidation chemical composition invades the formation, coating formation particles (e.g., sand) and allowing the particles to agglomerate or aggregate within the treated region of the formation. The treated region is now less susceptible to collapse if a portion of the formation is removed around that production tubing or equipment.

The formation consolidation chemical compositions include a chemical binder such as a resin or a polymer liquid resin. The binder is generally pumped through perforation in the production tubing or casing or liner into pore spaces in the formation. The binder then undergoes an in-situ solidification process, which may be aided by use of a catalyst or hardening agent. The chemical binder coats the formation particles (e.g., sand grains). The formation is then subjected to an overflush to improve formation permeability. As the binder hardens, with or without a hardening agent, the weakly consolidated, semi consolidated or unconsolidated formation is converted into a consolidated formation, where the particles have been converted into a permeable synthetic sandstone. Formation consolidation is designed to strengthen the formation around the well bore so that drag forces of flowing production fluids at a desired production rate do not dislodge formation particles such as sand grains, reducing sand or particulate co-production.

The chemical binders (1) should not precipitate until enough time has elapsed to allow proper placement in the wellbore, (2) should be only a fraction of the total volume so that the sand will remain permeable, (3) should adhere strongly to the sand grains, (4) should have a short hardening or waiting time after placement, and (5) should be insensitive to minor variations in chemical purity or mixing procedures in all types of sand.

Chemistry of Resins

The resins generally used as chemical binders are solid, hard to soft, organic, non-crystalline products that have broader or narrower molecular weight distributions. The resins normally have a melting or softening range and are brittle in their solid state. Chemical resins are generally raw materials, for example for binders, curable molding composition adhesives and coatings. Resins are typically divided into two categories: 1) thermosetting resins and 2) thermoplastic resins. The consolidation chemicals for use in this invention can be either of these or combinations of one or more thermosetting and/or thermoplastic resins.

Process of Curing

The chemical binders, such as resins, are transformed from a liquid form into a 3D solid network through a cross-linking or curing. During the cross-linking process, small monomers or oligomer molecules are linked together into clusters via chemical bonds, which can be hydrogen bonding, electrostatic interactions, ionic bonding, and/or covalent bonding. These clusters aggregate to form larger clusters until a network is formed that spans the reacting mass. During cluster build-up, viscosity increase can be modeled by an extension of Stoke's law of viscosity. As viscosity increase due to the increased cluster size, cluster movement become restricted. At the so-called gel point, the cross-linked or cured network spans the entire reacting mass and large-scale movement is no longer possible. The time or point at which this occurs is called the gel time. At this point, the viscosity of the fluid rises very rapidly asymptotically approaching infinity. The chemical consolidation composition must be pumped into the formation or zone before full curing occurs, because after the gel time, no fluid can be squeezed into formation.

In such consolidation compositions, the viscosity typically remains fairly constant until the gel time. Near the gel point, the viscosity asymptotically increases to infinity as characterized by the gel time and a universal constant as set forth in Equation (1).

$$\eta = \eta_{t=0} \frac{1}{\left(1 - \frac{t}{t_{gel}}\right)^k}$$

This gel time itself is related to the cross-linking reaction rate k, which is dependent on temperature T as shown in Equation (2).

$$k = (Ae)^{-\frac{E_a}{RT}}$$

As a result, the viscosity dependency on time and temperature near the gel point is critical. During the cross-linking reaction, there may also be a slight increase in density (shrinkage).

Resin Curing/Solidification

Solidification or cure rate is a property that effects which curable consolidation composition can be used in a given application. Cure rate of a consolidation composition depends primarily on temperature and catalyst. Catalyst used in such composition are typically metal salts and acids or mixtures thereof. The catalyst catalyze the curing process (speed it up) and can provide additional mechanical strength of the cross-linked network. The catalysts are generally Lewis acids. Exemplary catalysts include, without limitation, $AlCl_3$, $Al(SO_4)_3$, $NiCl_2$, $ZrOCl_2$, $NH_4Cl$, $Cr(CH_3COO)_3$ and o-Phosphoric acid or similar catalysts or mixture or combinations thereof. By controlling the type, amount and release of catalyst, the on set of curing and ultimate time to gel point can be controlled. Formation characteristic play a roll in the selection of appropriate consolidation composition and appropriate catalyst so that the cure rate is sufficient slow to permit formation penetration to a desired extent before the gel point of the composition is reached. The life of consolidation is governed by the resin system used and to a secondary extent by catalysts and other inorganic salts with mono-, di- and tri-valent cations at various concentrations, which impart added strength to the cured material.

Suitable Reagents

Conglomeration Composition

The aggregation, agglomeration or conglomeration compositions suitable for use in this invention include, without limitation, any composition that is capable of changing the aggregation propensity or potential and/or zeta potential of the particles of a weakly consolidated, semi consolidated or unconsolidated formation imparting to the formation a sufficient strength to reduce collapse or cave in during production at a velocity sufficient to form a cavities or a cavity surrounding a well bore in a zone of a producible formation. Exemplary examples of such compositions include, without limitation, the compositions disclosed in U.S. Pat. Nos. 7,392,847 and 7,350,579 (which are incorporated by reference due to the operation of the last paragraph before the claims), consolidation composition described below introduced at relatively low concentrations and with relatively low cross-linking agents so that the matrix is non-uniform and incomplete, or any other composition that change the aggregation propensity or potential and/or zeta potential of formation particles without converting the particles into a matrix having sufficient strength to resist cavitation via producing the formation at velocities above a well critical draw down pressure.

Amine and Phosphate Reaction Products

Suitable amines include, without limitation, any amine that is capable of reacting with a suitable phosphate ester to form a composition that forms a deformable coating on a metaloxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quino line and alkyl quino line or mixture of alkyl quino line, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where $x+y=3$ and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Surface Acidifying and Modifying Compositions

Suitable acidifying agents include, without limitation, sulfuric acid, phosphoric acid, hydrochloride acid, nitric acid, carboxylic acids, chlorated carboxylic acids, carbylsulfonic acids, where the carbyl group has between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Exemplary examples of sulfonic acid type acidifying agents include, without limitation, alkysuflonic acids, arylsulfonic acids, alkarylsulfonic acids, aralkylsulfonic acids, or mixture or combinations thereof.

Exemplary examples of alkylsulfonic acids having between about between about 1 and 16 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof. Exemplary examples of alkylsulfonic acids include, without limitation, methylsulfonic acid, ethylsulfonic acid, 2-hydroxyethylsulfonic acid ($OH-CH_2CH_2-SO_3H$), propylsulfonic acid (all isomers), butylsulfonic acid (all isomers), pentylsulfonic acid (all isomers), hexylsulfonic acid (all isomers), heptylsulfonic acid (all isomers), octylsulfonic acid (all isomers), nonylsulfonic acid (all isomers), decylsulfonic acid (all isomers), undecylsulfonic acid (all isomers), dodecylsulfonic acid (all isomers), C13 sulfonic acid (all isomers), C14 sulfonic acid (all isomers), C15 sulfonic acid (all isomers), C16 sulfonic acid (all isomers), or mixture or combinations thereof.

Exemplary examples arylsulfonic acids include, without limitation, benzene sulfonic acid, naphthalene sulfonic acid, or mixture or combinations thereof.

Exemplary examples alkarylsulfonic acids include, without limitation, methylbenzene sulfonic acid, ethylbenzene sulfonic acid, propylbenzene sulfonic acid, pentylbenzene sulfonic acid, hexylbenzene sulfonic acid, heptylbenzene sulfonic acid, octylbenzene sulfonic acid, nonylbenzene sulfonic acid, decylbenzene sulfonic acid, undecylbenzene sulfonic acid, dodecylbenzene sulfonic acid, tridecylbenzene sulfonic acid, di and tri-alkyl substituted analogs or mixture or combinations thereof.

Exemplary examples aralkylsulfonic acids include, without limitation, phenylmethyl sulfonic acid, phenylethyl sulfonic acid, other phenylated alkyl sulfonic acids or mixture or combinations thereof.

Suitable surface modifying agents include, without limitation, primary, secondary or tertiary amines, primary, secondary, or tertiary phosphines, or mixtures or combinations thereof. Preferred amines include, without limitation, primary amines having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof, or mixture or combinations thereof.

Suitable exchange agents include, without limitation, any phase transfer agent. Exemplary examples of exchange agents useful in this invention include, without limitation, ammonium salts having the general formula $R^1R^2R^3R^4N^-Z^-$, phosphonium salts having the general formula $R^1R^2R^3R^4P^+Z^-$, or mixtures or combinations thereof, where $R^1$, $R^2$, $R^3$, and $R^4$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO_4^-$, $H_2PO_4^-$, $HSO_3^-$, $H_2PO_3^-$, or similar counterions or mixtures or combinations thereof, where R a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

Exemplary examples of phosphonium salts useful in this invention include, without limitation, phosphonium salts having the general formula $R^1R^2R^3R^4P^+Z^-$, where $R^1$, $R^2$, $R^3$, and $R^4$ are independently a hydrogen atom, an alkyl group, an aryl group, an aralkyl group, or an alkaryl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and $Z^-$ is $OH^-$, $OR^-$, $F^-$, $Cl^-$, $Br^-$, $I^-$, $HSO_4^-$, $H_2PO_4^-$, $HSO_3^-$, $H_2PO_3^-$, or similar counterions or mixtures or combinations thereof, where R a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof.

Consolidation Compositions

Consolidation compositions include, without limitation, thermosetting resins, thermoplastic resins, thermoplastic elastomers, other thermally or chemically cross-linkable resins or polymers, or mixtures or combinations thereof.

Thermosetting resins change irreversibly under the influence of heat from a fusible and soluble material into an infusible and insoluble due to the formation of a covalently cross-linked, thermally stable network. Thermosetting polymers comprise relatively low molecular chains (MW<<10000). After curing or crosslinking, the chains are chemically linked together into a network that generally constitutes as single macro-molecular assembly. These chemical bonds or cross-links can be covalent bonds, ionic bonds, hydrogen bonds, and/or electrostatic interactions. All such bonds are subject to break down due to the application of heat or due to chemical interactions or reactions. However, break down conditions are generally severe because bond breaking is necessary. Exemplary thermosetting resins include, without limitation phenolic resins (reaction products of formaldehyde and a phenolic compound), amino resins (reaction of formaldehyde with urea or melamine), polyester resins, epoxy resins, vinyl ester resins, polyurethane resins, alkyl resins or mixtures or combinations thereof. Thermosetting resins are known to be stable for indefinite periods of time over wide ranges of temperature. They are generally chemically inert to wellbore fluids, rocks and environmentally safe. Thermosetting resins form hard plastic materials, which can seal or consolidate the formation or zone. Because cure or solidification times are generally short in oil well applications, treatments generally take only a few hours. Thermoset resins cross-linked thermally and/or catalytically form substantially infusible or insoluble materials, which do not soften on reheating. When cross-linked and cured, the thermoset polymers are strong, hard and tough.

Thermoplastic resins and thermoplastic elastomers soften and flow when heat and pressure are applied, which is a reversible process. Thermoplastic polymers comprise chains of monomeric building blocks having a relatively high molecular weight (MW>10,000). The resins are held together by physical bonds between the chains forming a cohesive polymeric matrix. These physical bonds are relatively easily broken by heating or by dissolving. Thermoplastics include, without limitation, polyolefins, for example poly alpha olefins, random and/or block copolymer of olefins (where copolymer means two or more monomers comprise the polymer backbone), random and/or block copolymers of an olefin and a diene, silicon thermoplastic resins and thermoplastic elastomers, other thermoplastic resins and thermoplastic elastomer and mixtures or combinations thereof. Exemplary examples include, without limitation, polyethylene (PE), polypropylene (PP), polystyrene (PS), poly vinyl chloride (PVC), polyvinylpyridine, polyalkatedstyrene, polyhalogenatedstyrene, styrene butadiene blocked copolymers, styrene isoprene blocked copolymers, styrene butadiene isoprene copolymers, or the like or mixtures or combinations thereof.

Conglomeration Treating Conditions

The present invention also broadly relates to a method for producing including the step of circulating and/or pumping a conglomeration fluid into a producible formation or zone thereof, where the fluid includes a composition designed to increase an aggregation potential or decrease an absolute value of a zeta potential of particles in the formation resulting in a decrease in formation collapse or cave in.

DETAILED DESCRIPTION OF THE DRAWINGS

Referring now to FIGS. 1A&B, an embodiment of a first step of the method and system of this invention, generally 100, is shown to include a well bore 102 into a formation 104 including a top zone 106, a producible zone 108 and a bottom zone 110. The top zone 106 and the bottom zone 110 can be non-producible zones or producible zones within the formation 104, but are not being subjected to treatment. Optionally, the producible zone 108 is separated below by a packer or a plurality of packers 112. If the zone 106 is a producible zone of the formation 104, then there could also be a packer or a plurality of packers (not shown) separating the producible or middle zone 108 from the top zone 106. The well bore 102 is shown here to including casing 114, where the casing 114 can be simply casing or a liner, cement, or cemented casing or a cemented liner. However, the well bore can also be uncased.

Figure 1B:
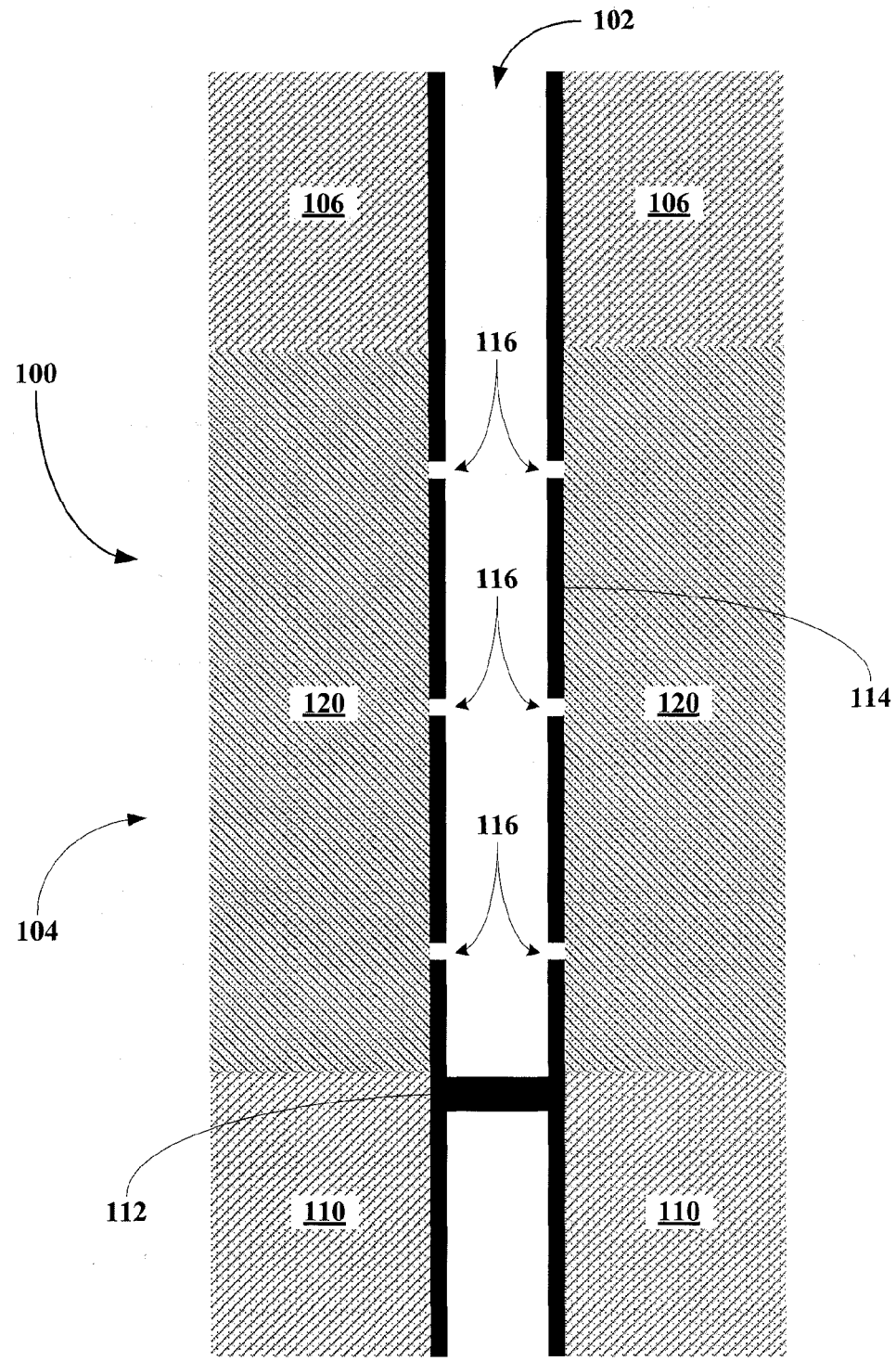
FIG. 1B depicts a conglomerated formation.

The casing or liner 114 is perforated in the producible zone 108 by a plurality of perforations 116. In this case, an aggregation, agglomeration or conglomeration composition 118 is injected through the perforations 116 in to the zone 108 to produce a conglomerated zone 120 as shown in FIG. 1B.

Figure 2A:
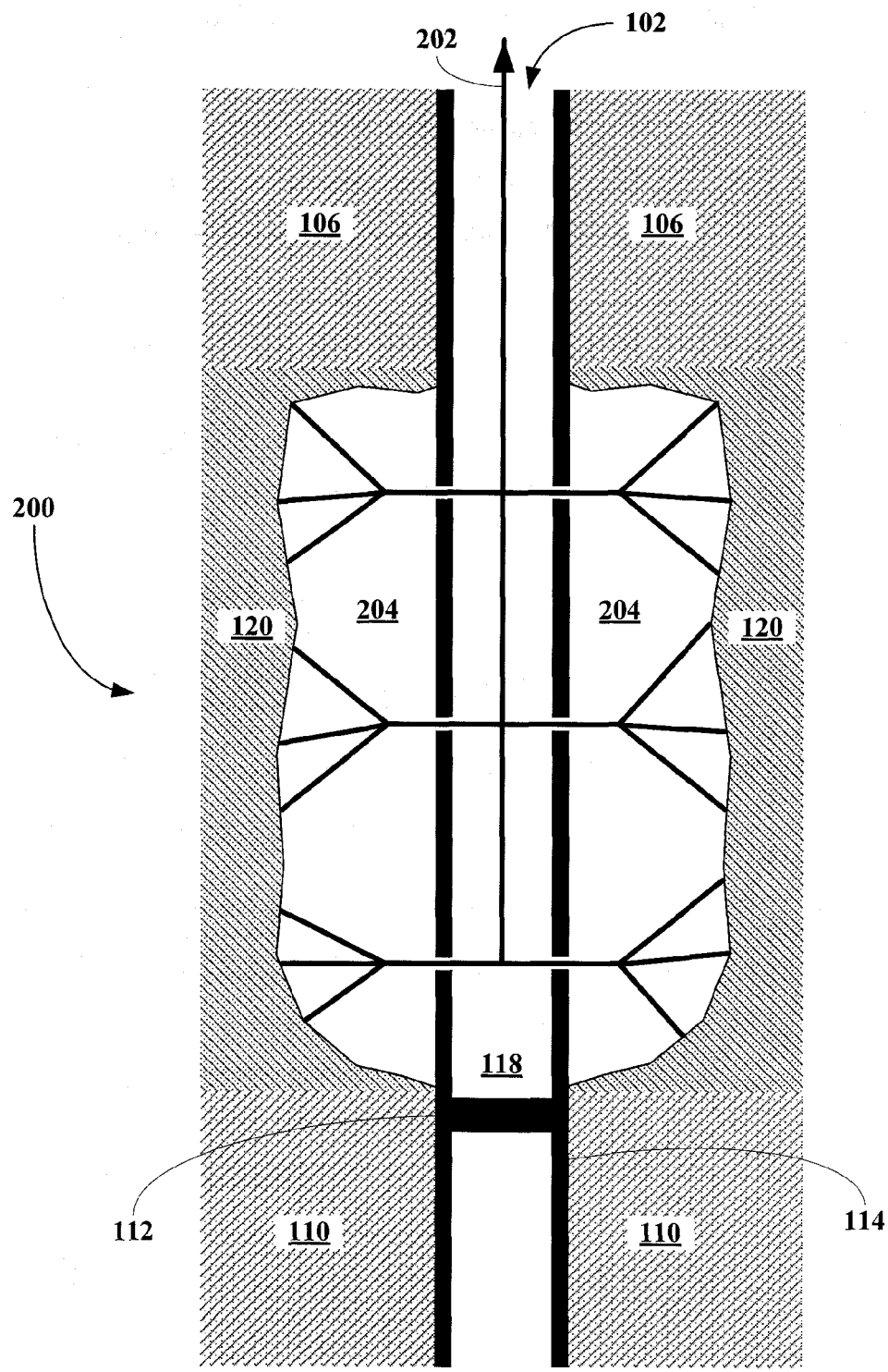
FIG. 2A depicts production of the conglomerated formation above its critical draw down pressure to cavitate the producible formation or to form cavities surrounding the well bore.

Referring now to FIGS. 2A&B, an embodiment of a second step of the method and system of this invention, generally 200, is shown to include the well bore 102 into the conglomerated producible zone 120 between the top zone 106 and the bottom zone 110. The well bore 102 is shown here cased with the casing 114, which can be simply casing or a linear, cement, or cemented casing or a cemented liner or even uncased or open.

Figure 2B:
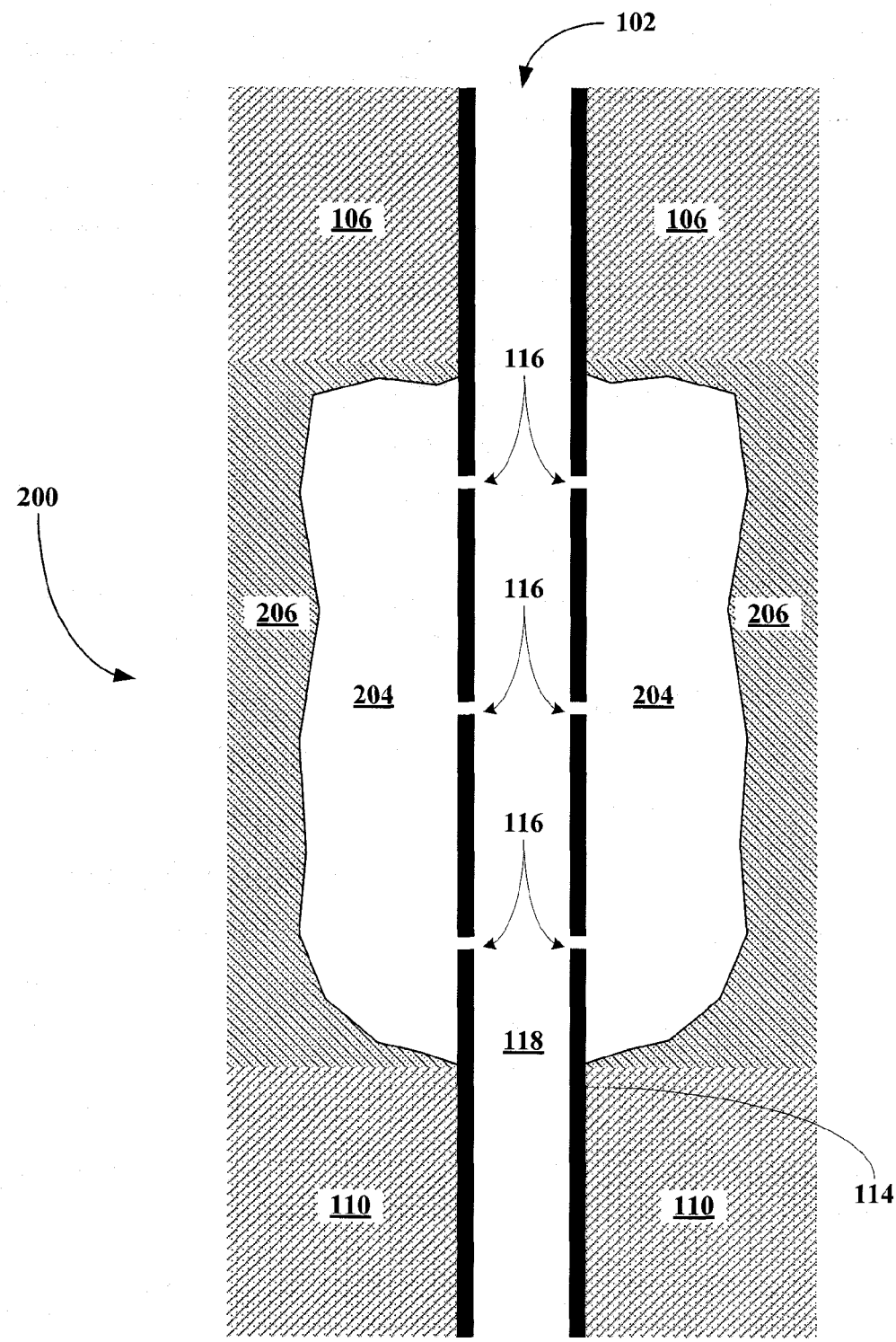
FIG. 2B depicts a cavitated, conglomerated formation.

After the formation has been conglomerated as shown in FIGS. 1A&B, the conglomerated formation 120 is produced above its critical draw down pressure as shown in FIG. 2A to produce a mixture 202. The mixture 202 includes, but is not limited to, formation particulate of the conglomerated zone 120. The co-production of the portion of the conglomerated zone 120 forms a cavity or cavities 204 surrounding the well bore 102 in the zone 120 to form the cavitated, conglomerated, producible zone 206 as shown in FIG. 2B.

Figure 3:
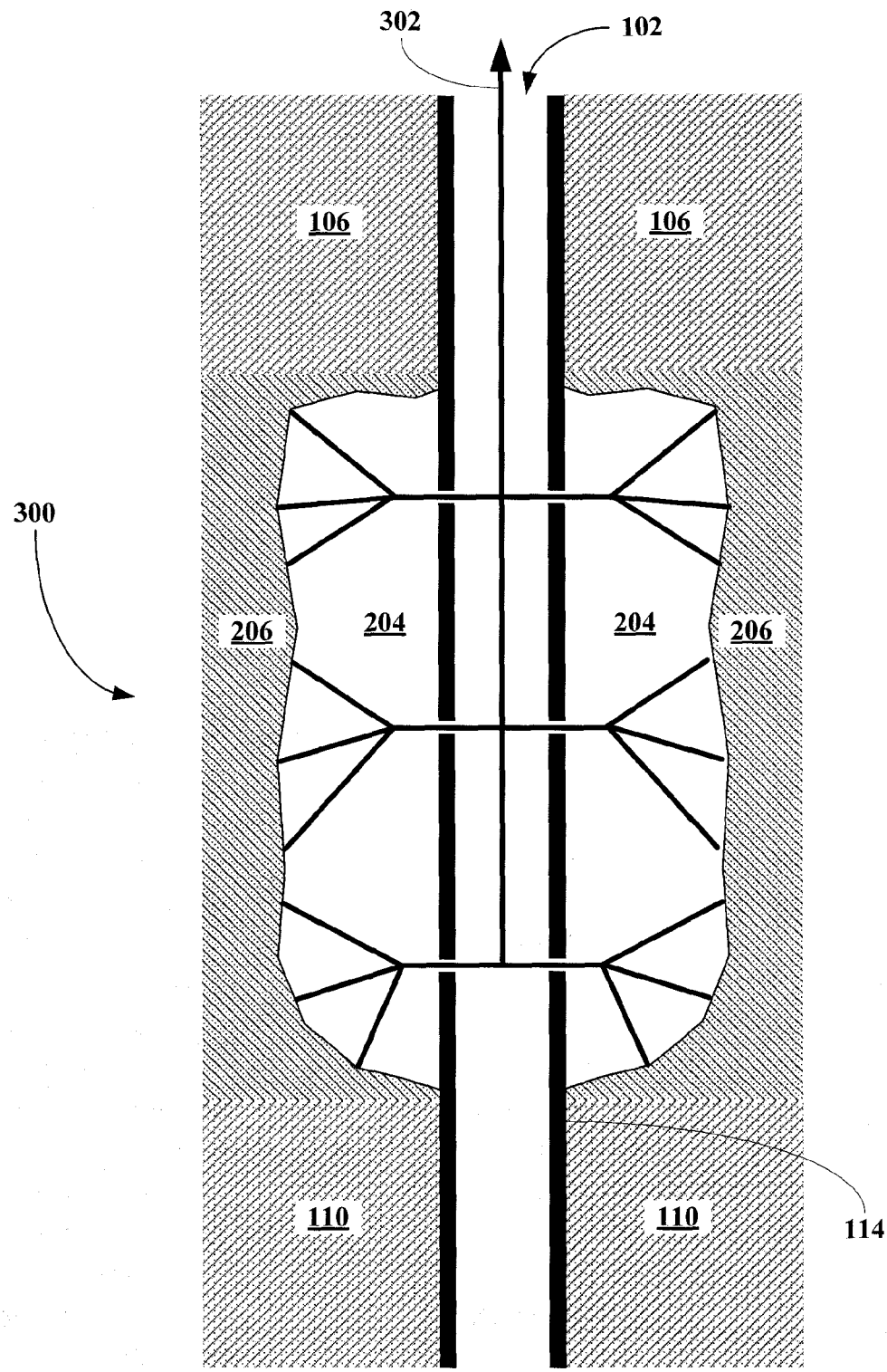
FIG. 3 depicts production of a cavitated, conglomerated formation.

After cavitation, the cavitated, conglomerated producible zone 206 is put or placed on production below its critical draw down pressure as shown in FIG. 3, generally 300, to produce production fluids 302, where the production fluids 302 having reduced co-production of formation particulate, i.e., co-production of formation particulate has been reduced, substantially eliminated or eliminated.

Figure 4A:
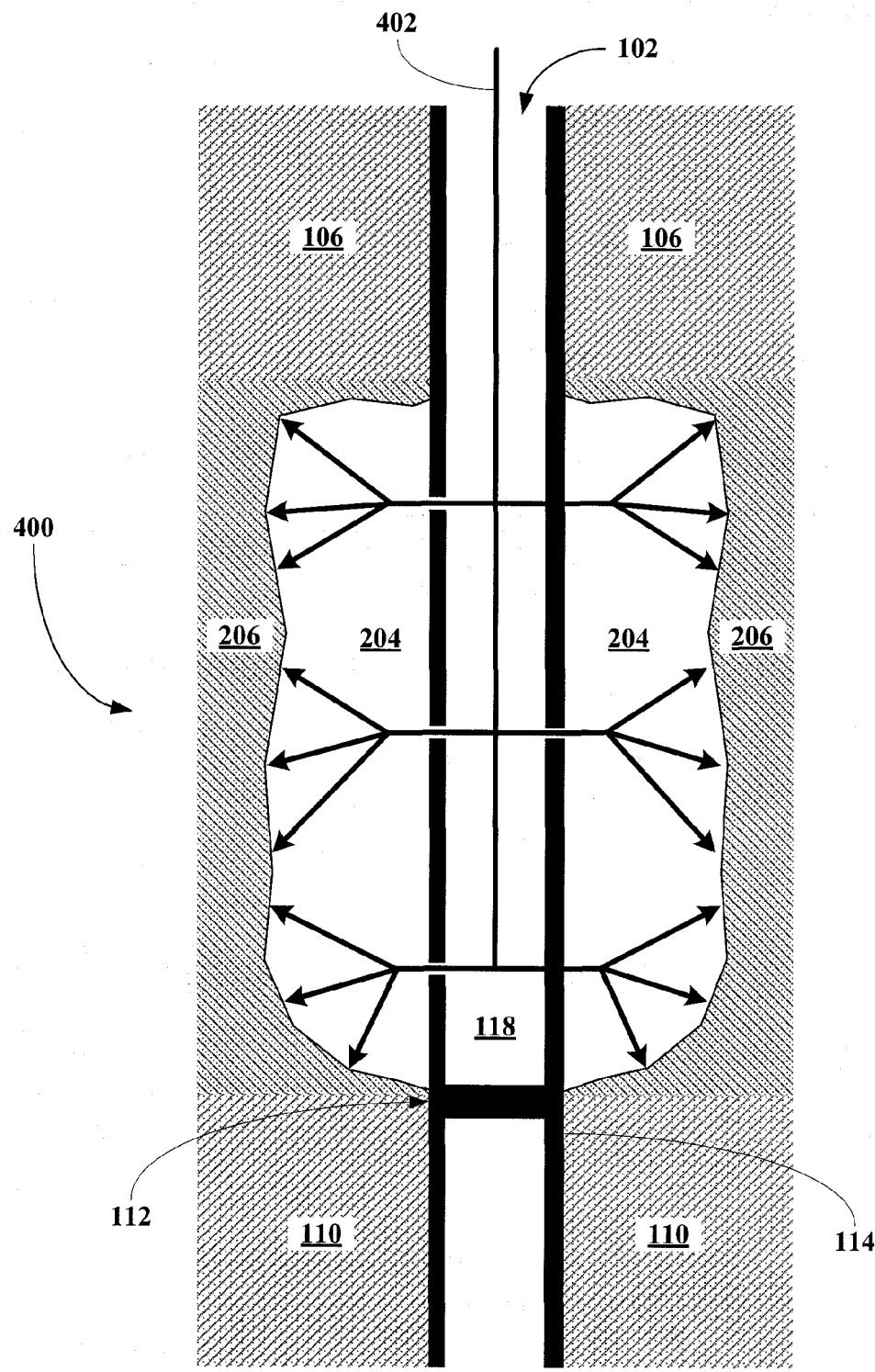
FIG. 4A depicts injection of a consolidation or conglomeration chemical composition into a cavitated, conglomerated formation.
Figure 4B:
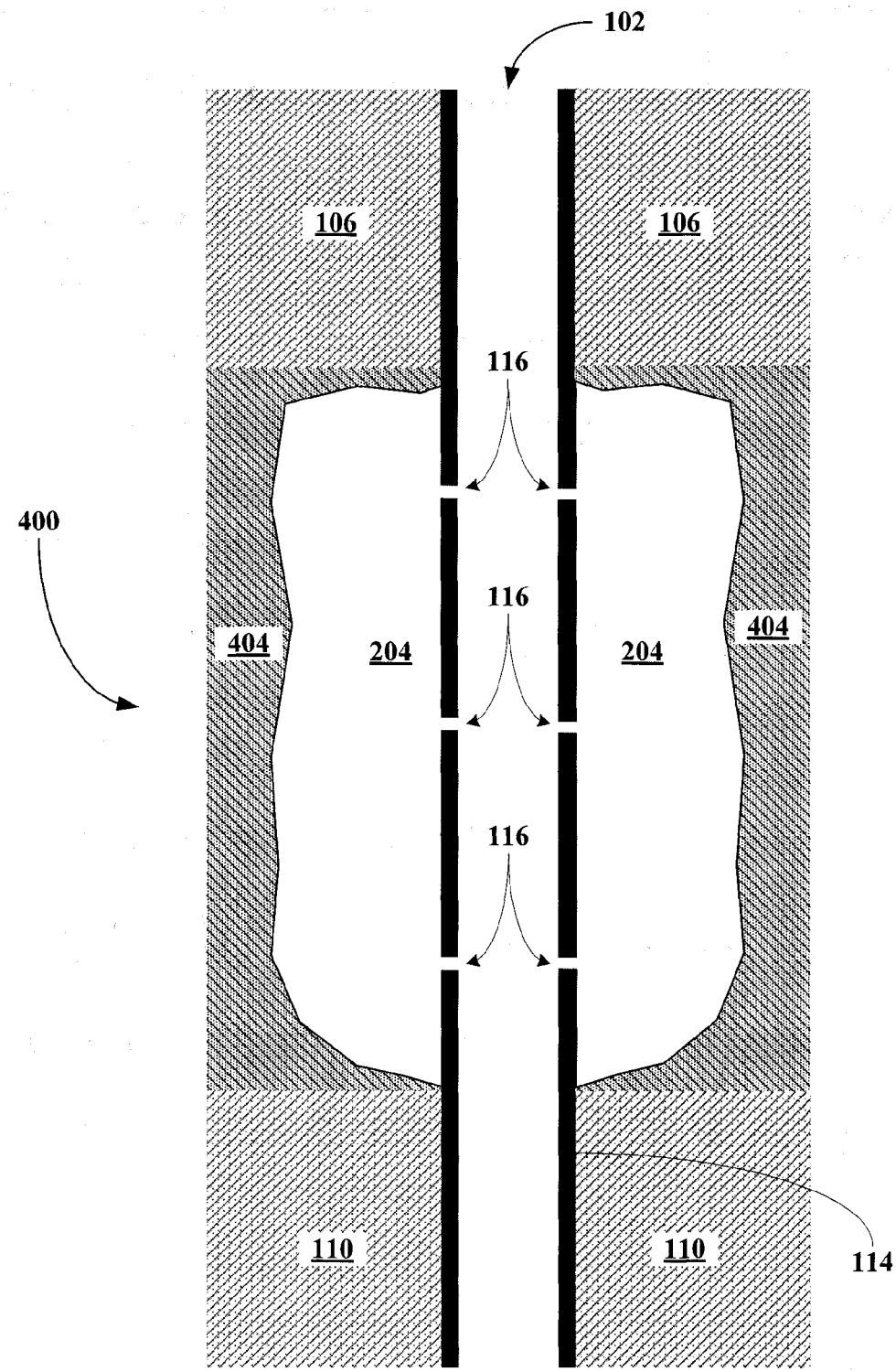
FIG. 4B depicts a consolidated or conglomerated, cavitated, conglomerated formation.

Although the embodiments of method and system of this invention can include only the first three steps set forth pictorially in FIGS. 1A-3, the method and system can also include the step of consolidating or further conglomerating the cavitated, conglomerated zone 206 as shown in FIGS. 4A&B, generally 400. Looking at FIG. 4A, the cavitated, conglomerated zone 206 is treated with a consolidating composition or further conglomerating composition 402. The consolidation composition or further conglomeration composition 402 is injected into the well bore 102 having the optional packer or plurality of packers 112 (to isolate the treatment) through the perforations 116 through the cavity 204 and into the zone 206 to form a consolidated or further conglomerated, cavitated, producible zone 404 as shown in FIG. 4B.

Figure 5:
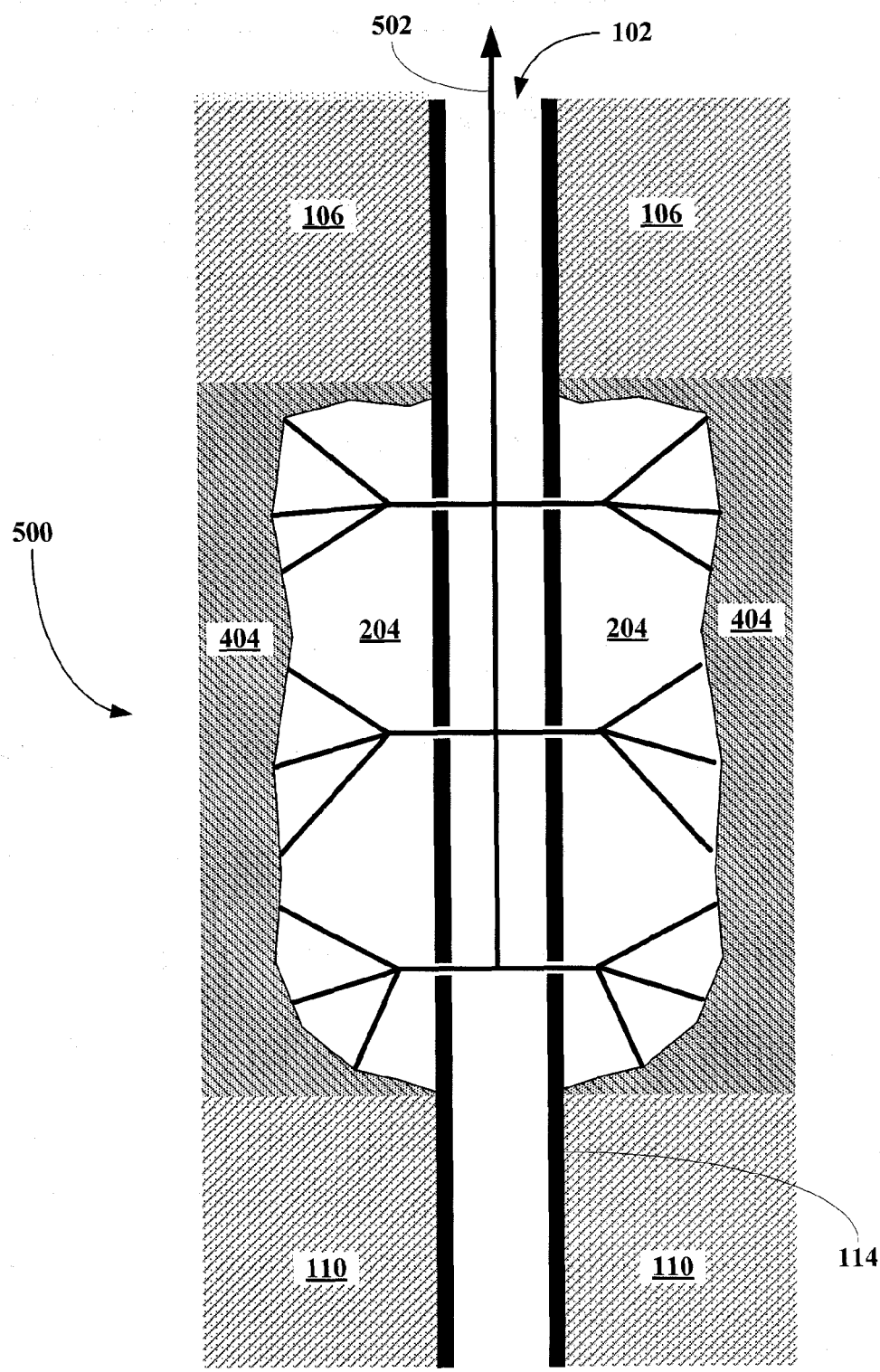
FIG. 5 depicts production of a consolidated or conglomerated, cavitated, conglomerated formation.

Following consolidation or further conglomeration, the consolidated or further conglomerated, cavitated producible zone 404 is put or placed on production as shown in FIG. 5, generally 500, to produce hydrocarbons 502, where the hydrocarbons 502 have reduced formation particulate, i.e., MSFR is increased.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method comprising:
   injecting an effective amount of an aggregating, agglomerating, or conglomerating composition into a weakly consolidated, semi-consolidated or unconsolidated formation or a zone thereof, where the effective amount of the aggregating, agglomerating, or conglomerating composition is sufficient to reduce or prevent formation cave in or collapse, when the formation or zone is produced above its critical draw down pressure,
   producing the conglomerated formation above its critical draw down pressure, until a desired volume of formation particulate co-production is produced to form a cavitated formation or zone, and
   producing the cavitated formation or zone below its critical draw down pressure,
   where the cavitation comprises a cavity or void space between the casing, liner, production tubing or equipment and the formation and the cavitation increases a higher maximum sand free production rate (MSFR).

2. The method of claim 1, wherein the aggregating, agglomerating, or conglomerating composition comprises: (1) a reaction product of an amine and a phosphate ester, (2) at least an acidifying agent and a surface modifying agent, or a mixture or combination thereof (1) and (2).

3. The method of claim 1, further comprising:
prior to the second producing step, injecting an effective amount of a second aggregating, agglomerating, or conglomerating composition into the cavitated formation or a zone thereof, wherein the effective amount of the second aggregating, agglomerating, or conglomerating composition is sufficient to further conglomerate the formation or zone.

4. The method of claim 3, wherein the aggregating, agglomerating, or conglomerating compositions are the same or different and comprise: (1) a reaction product of an amine and a phosphate ester, (2) at least an acidifying agent and a surface modifying agent or a mixture or combination thereof (1) and (2).

5. The method of claim 1, further comprising:
prior to the second producing step, injecting an effective amount of a consolidating composition into the cavitated formation or a zone thereof, wherein the effective amount of the consolidating composition is sufficient to consolidate the formation or zone.

6. The method of claim 5, wherein the aggregating, agglomerating, or conglomerating composition comprises: (1) a reaction product of an amine and a phosphate ester, (2) at least an acidifying agent and a surface modifying agent or a mixture or combination thereof (1) and (2).

7. The method of claim 5, wherein the consolidating composition comprises a thermosetting resin, a thermoplastic resin, a thermoplastic elastomer, other thermally or chemically cross-linkable resins or polymers, or mixtures or combinations thereof.

8. The method of claim 1, wherein the aggregating, agglomerating, or conglomerating composition comprises a reaction product of an amine and a phosphate ester.

9. The method of claim 1, wherein the aggregating, agglomerating, or conglomerating composition comprises at least an acidifying agent and a surface modifying agent.

10. The method of claim 9, wherein the aggregating, agglomerating, or conglomerating composition further comprises an aggregation enhancing agent, a particulate metal oxide-containing solid surface exchange agent, a thickening agent, a fluid carrier or mixtures and combinations thereof.

11. A method comprising:
injecting an effective amount of a first aggregating, agglomerating, or conglomerating composition into a weakly consolidated, semi-consolidated or unconsolidated formation or a zone thereof, where the effective amount of the aggregating, agglomerating, or conglomerating composition is sufficient to reduce or prevent formation cave in or collapse, when the formation or zone is produced above its critical draw down pressure,
producing the conglomerated formation above its critical draw down pressure, until a desired volume of formation particulate co-production is produced to form a cavitated formation or zone,
injecting an effective amount of a second aggregating, agglomerating, or conglomerating composition into the cavitated formation or a zone thereof, wherein the effective amount of the second aggregating, agglomerating, or conglomerating composition is sufficient to further conglomerate the formation or zone, and
producing the cavitated formation or zone below its critical draw down pressure,
where the cavitation comprises a cavity or void space between the casing, liner, production tubing or equipment and the formation and the cavitation increases a higher maximum sand free production rate (MSFR).

12. The method of claim 11, wherein the first and second aggregating, agglomerating, or conglomerating compositions are the same or different and comprise: (1) a reaction product of an amine and a phosphate ester, (2) at least an acidifying agent and a surface modifying agent or a mixture or combination thereof (1) and (2). cross-linkable resins or polymers, or mixtures or combinations thereof.

13. The method of claim 11, wherein the aggregating, agglomerating, or conglomerating composition comprises a reaction product of an amine and a phosphate ester.

14. The method of claim 11, wherein the aggregating, agglomerating, or conglomerating composition comprises at least an acidifying agent and a surface modifying agent.

15. The method of claim 14, wherein the aggregating, agglomerating, or conglomerating composition further comprises an aggregation enhancing agent, a particulate metal oxide-containing solid surface exchange agent, a thickening agent, a fluid carrier or mixtures and combinations thereof.

16. A method comprising:
injecting an effective amount of an aggregating, agglomerating, or conglomerating composition into a weakly consolidated, semi-consolidated or unconsolidated formation or a zone thereof, where the effective amount of the aggregating, agglomerating, or conglomerating composition is sufficient to reduce or prevent formation cave in or collapse, when the formation or zone is produced above its critical draw down pressure,
producing the conglomerated formation above its critical draw down pressure, until a desired volume of formation particulate co-production is produced to form a cavitated formation or zone,
injecting an effective amount of a consolidating composition into the cavitated formation or a zone thereof, wherein the effective amount of the consolidating composition is sufficient to consolidate the formation or zone, and
producing the cavitated formation or zone below its critical draw down pressure,
where the cavitation comprises a cavity or void space between the casing, liner, production tubing or equipment and the formation and the cavitation increases a higher maximum sand free production rate (MSFR).

17. The method of claim 16, wherein the aggregating, agglomerating, or conglomerating composition comprises: (1) a reaction product of an amine and a phosphate ester, (2) at least an acidifying agent and a surface modifying agent or a mixture or combination thereof (1) and (2).

18. The method of claim 16, wherein the consolidating composition comprises a thermosetting resin, a thermoplastic resin, a thermoplastic elastomer, other thermally or chemically cross-linkable resins or polymers, or mixtures or combinations thereof.

19. The method of claim 16, wherein the aggregating, agglomerating, or conglomerating composition comprises a reaction product of an amine and a phosphate ester.

20. The method of claim 16, wherein the aggregating, agglomerating, or conglomerating composition comprises at least an acidifying agent and a surface modifying agent.

21. The method of claim 20, wherein the aggregating, agglomerating, or conglomerating composition further comprises an aggregation enhancing agent, a particulate metal oxide-containing solid surface exchange agent, a thickening agent, a fluid carrier or mixtures and combinations thereof.

* * * * *